(12) United States Patent
Kropac et al.

(10) Patent No.: US 9,581,307 B2
(45) Date of Patent: Feb. 28, 2017

(54) BLOCK LIGHT MODULE

(71) Applicant: Varroc Lighting Systems s.r.o., Senov u Noveho Jicina (CZ)

(72) Inventors: Miroslav Kropac, Ostrava-Vyskovice (CZ); Ludek Mazal, Bilovec (CZ); Tomas Mateju, Ostrava-Hrabuvka (CZ); Libor Juttner, Suchdol nad Odra (CZ)

(73) Assignee: VARROC LIGHTING SYSTEMS S.R.O. (CZ)

( * ) Notice: Subject to any disclaimer, the term of this patent is extended or adjusted under 35 U.S.C. 154(b) by 443 days.

(21) Appl. No.: 14/147,009

(22) Filed: Jan. 3, 2014

(65) Prior Publication Data
US 2014/0233251 A1    Aug. 21, 2014

(30) Foreign Application Priority Data

Feb. 15, 2013  (CZ) ..................... 2013-119

(51) Int. Cl.
*F21S 8/10* (2006.01)
*G02B 6/04* (2006.01)
*F21V 8/00* (2006.01)

(52) U.S. Cl.
CPC .......... *F21S 48/2243* (2013.01); *F21S 48/215* (2013.01); *F21S 48/2268* (2013.01); *F21S 48/232* (2013.01); *F21S 48/24* (2013.01); *G02B 6/04* (2013.01); *G02B 6/0018* (2013.01); *G02B 6/0031* (2013.01)

(58) Field of Classification Search
CPC ....... G02B 26/02; G02B 26/0833; G02B 5/10; G02B 6/0028; G02B 6/0031; G02B 6/0046; G02B 6/04; G02B 6/001; F21V 14/02; F21V 7/0091; B60Q 1/26; B60Q 2500/10;B60Q 3/0209; B60Q 3/0226; B60Q 3/0279; B60Q 3/0283; B60Q 3/0286; B60Q 3/0296; B60Q 3/044; B60Q 1/44; B60Q 1/46; B60Q 1/302; B60Q 1/52; B60Q 2400/20; B60R 1/00; B60R 1/001; B60R 1/12; B60R 2001/1253; B60R 2300/105; B60R 2300/30; B60R 2300/303; F21Y 2101/02; F21S 48/2243; F21S 48/232; F21S 48/24; F21S 48/2268; F21S 48/215

See application file for complete search history.

(56) References Cited

U.S. PATENT DOCUMENTS

2004/0257790 A1 * 12/2004 Tanaka .................... B60Q 1/26
362/23.07

FOREIGN PATENT DOCUMENTS

JP    2005032579 A    2/2005

* cited by examiner

*Primary Examiner* — Diane Lee
*Assistant Examiner* — Danielle Allen
(74) *Attorney, Agent, or Firm* — Cantor Colburn LLP

(57) ABSTRACT

A light module for a motor vehicle is disclosed. The light module includes a light source and a reflecting unit. The light module also includes an optical waveguide, wherein the waveguide is formed by a plate-shaped body having an L-shaped cross section, the light-reflecting unit comprises a reflector arranged in front of a shorter input part of the waveguide, and wherein at a place where a shorter inlet part of the waveguide passes into a longer outlet part of the waveguide, an angled surface is provided for total reflection of light passing through the shorter inlet part of the waveguide to the longer outlet part of the waveguide, wherewith a bottom area and an adjacent face of the outlet part of the waveguide are provided with a white coating.

20 Claims, 2 Drawing Sheets

BLOCK LIGHT MODULE

CROSS-REFERENCES TO RELATED APPLICATIONS

This patent application claims priority to Czech Republic Patent Application Serial No. PV 2013-0119 filed on Feb. 15, 2013, which is incorporated herein by reference in its entirety.

BACKGROUND OF THE INVENTION

The invention relates to a light module, which is designed especially for tail lights, directional signal lights, or daytime lights, for motor vehicles.

From JP 2005032579 (A) a design for lights is known which is comprised of a straight optical waveguide (lightguide), which is connected to a light module on its (the waveguide's) input face, which light module is comprised firstly of a light source disposed perpendicularly to the longitudinal axis of the waveguide and provided with one or more LEDs, and secondly of a collimating lens, to ensure full reflection of light from the light source, wherewith this light is directed to the input face of the waveguide. The waveguide is then provided with a reflective surface, disposed in parallel to its longitudinal axis, for emitting light in the region along the straight waveguide.

Disadvantages of this design are particularly limitations on its use, particularly limitation to areas requiring illumination by a narrow strip of light through straight elongated fixtures.

SUMMARY OF THE INVENTION

These and other advantages and features will become more apparent from the following description taken in conjunction with the drawings. In an exemplary embodiment, a light module for a motor vehicle is disclosed. The light module includes a light source and a reflecting unit. The light module also includes an optical waveguide, wherein the waveguide is formed by a plate-shaped body having an L-shaped cross section, the light-reflecting unit comprises a reflector arranged in front of a shorter input part of the waveguide, and wherein at a place where a shorter inlet part of the waveguide passes into a longer outlet part of the waveguide, an angled surface is provided for total reflection of light passing through the shorter inlet part of the waveguide to the longer outlet part of the waveguide, wherewith a bottom area and an adjacent face of the outlet part of the waveguide are provided with a white coating.

In another exemplary embodiment, a light module for a motor vehicle is disclosed. The light module includes a light source and a reflecting unit. The light module also includes an optical waveguide, wherein the waveguide is formed by a plate-shaped body having an I-shaped cross section, the light-reflecting unit comprises a reflector arranged laterally with respect to an outlet part of the waveguide, wherewith a bottom area and an adjacent face of the outlet part of the light guide are provided with a white coating.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
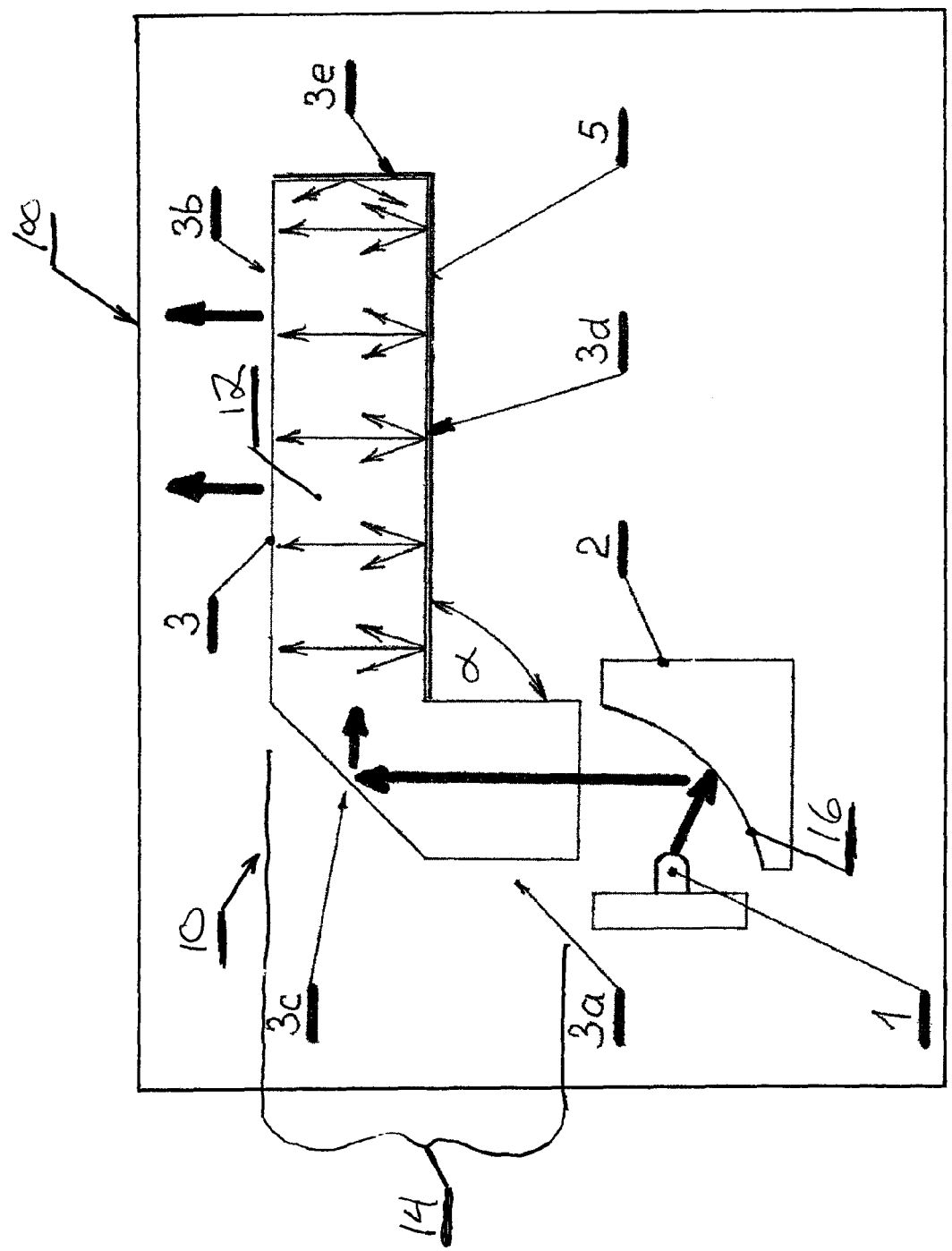
FIG. 1 shows a light module having an L-shaped cross-section.

Referring now to the Figures, in particular FIG. 1, where the invention will be described with reference to specific embodiments, without limiting same, the above-described disadvantages are eliminated by a light module 10, designed especially for tail lights, brake lights, directional signal lights, or daytime lights for motor vehicles 100, comprising a light source 1 and a reflecting unit 2, followed by an optical waveguide (lightguide) 3, wherewith according to the invention the light module 10 is characterized in that the waveguide 3 is formed by a plate-shaped body 12 having an L-shaped cross section 14, and the light-reflecting unit 2 is a reflector 16 arranged in front of the shorter input part 3a of the waveguide 3, wherewith at the place where the shorter inlet part 3a of the waveguide 3 passes into a longer outlet part 3b of the waveguide, an angled surface 3c is provided for total internal reflection of light passing through the shorter inlet part 3a of the waveguide 3 to the longer outlet part 3b of the waveguide 3, wherewith the bottom area or region 3d and the adjacent face 3e of the outlet part 3b of the waveguide 3 are provided with a white coating 5. Alternatively, as shown in FIG. 2, the waveguide 3 is formed by a plate-shaped body 18 having an I-shaped cross section 20, and the light-reflecting unit 2 is a reflector 22 arranged laterally with respect to the outlet part 3b of the waveguide 3, wherewith the bottom area 3d and the adjacent face 3e of the outlet part 3b of the waveguide 3 are provided with a white coating 5.

The essence of this solution is that the light source 1 is comprised of one or more LEDs, and that the reflectors 16, 20 are curved and have a metalized surface or is provided with a white coating or is comprised of white plastic.

Further essential for this design is that the output part 3b of the waveguide 3 has its light-emitting surface straight or curved as desired.

According to a preferred embodiment, the shorter input part 3a of the waveguide 3 forms an angle greater than 80° with the longer output part 3b of the waveguide 3, or the reflector 16 is disposed on the inner side (interior) of the outlet part 3b of the waveguide 3.

The advantage of this design of a light module 10 is that that it allows one to create a complete surface of light with a surface configuration corresponding to the requirements of the customer, not only for the needs of the automotive industry but also for the needs of other industries.

Figure 2:
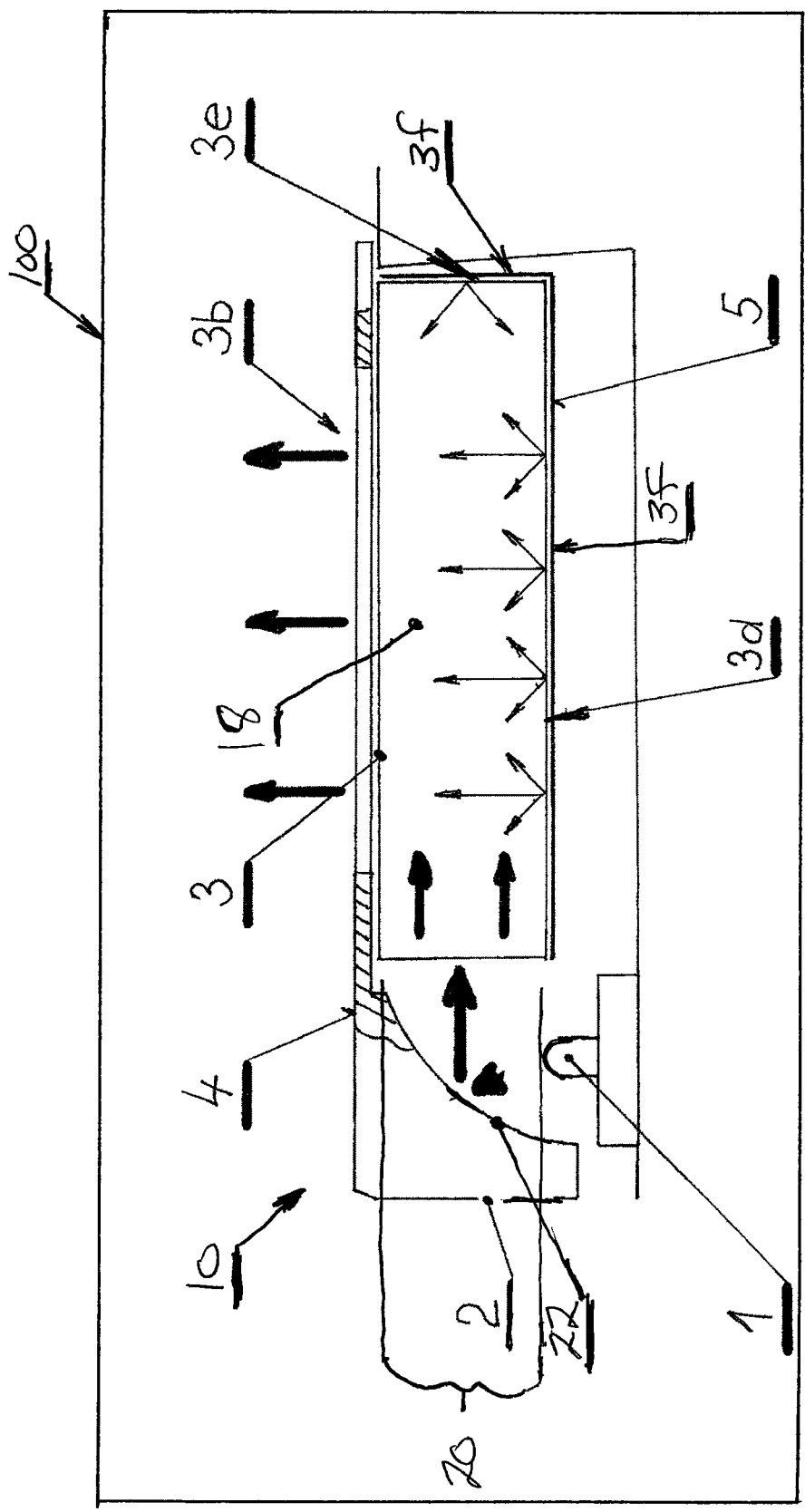
FIG. 2 shows a light module having an I-shaped cross-section.

As seen from FIG. 1, the light module 10 according to the invention may have an optical waveguide 3 which comprises a plate-shaped body 12 having an L-shaped cross section 14. A light-reflecting unit 2 is comprised of a reflector 16 disposed in front of the shorter input part 3a of the waveguide 3. At the point where the shorter input part 3a of the waveguide 3 passes into the longer output part 3b of the waveguide 3, an angled surface 3c is provided which brings about complete reflection of light passing through the shorter input portion 3a of the waveguide 3 to the longer output part 3b of the lightguide 3. The shorter inlet part 3a of the waveguide 3 is oriented at an angle α of 90° to the longer outlet part 3b of the waveguide 3.

The lower area of 3d and the adjacent face 3e of the output part 3b of the waveguide 3 are provided with a white coating 5. The light source 1 is either a single LED or a printed circuit board (PCB) with a plurality of LED.

The reflector 2 is curved and has either a metalized surface or is provided with a white coating 5, or is comprised of white plastic, depending on the application of the light module 10.

Depending on the requirements, the output part 3b of the waveguide 3 will have its light-emitting surface straight or curved, e.g. to form a closed circle.

In a variant embodiment of the light module 10, as seen from FIG. 2, the waveguide 3 is formed by a plate-shaped body 18 having an I-shaped cross section 20. The light-reflecting unit 2 is the reflector 22, this time arranged laterally with respect to the output part 3b of the waveguide 3. In a preferred embodiment, the reflector 22 is disposed inside the cover 4 of the output part 3b of the waveguide 3.

As in the preceding case, the lower region 3d and the adjoining face 3e of the outlet part 3b of the waveguide 3 are provided with a white coating 5.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A light module for a motor vehicle, comprising:
   a light source;
   a light reflecting unit; and
   an optical waveguide; wherein the waveguide is formed by a plate-shaped body having an L-shaped cross section, the plate-shaped body comprising an input part and an attached output part that together define the L-shaped cross-section, the input part being shorter than the output part, the light-reflecting unit comprises a reflector disposed outside an end of the waveguide and arranged in front of the input part of the waveguide, and wherein at a place where the input part of the waveguide passes into the output part of the waveguide, an angled surface is provided, for total reflection of light passing through the input part of the waveguide to the output part of the waveguide, wherewith a bottom area and an adjacent face of the output part of the waveguide are provided with a white coating, and wherein light from the light source is reflected by the reflector into the input part, reflected off the angled surface into the output part, and emitted from a face of the output part opposite the bottom area.

2. A light module for a motor vehicle, comprising
   a light source
   a light reflecting unit; and
   an optical waveguide, wherein the waveguide is formed by a plate-shaped body having an I-shaped cross section, the light-reflecting unit comprises a reflector disposed outside an end of the waveguide and arranged laterally with respect to an output part of the waveguide, wherewith a bottom area and an adjacent face of the output part of the light guide are provided with a white coating, wherein light from the light source is reflected by the reflecting unit into an end of the output part, and emitted from a face of the output part opposite the bottom area.

3. The light module according to claim 1, wherein the light source comprises one or more LEDs.

4. The light module according to claim 1, wherein the reflector is curved.

5. The light module according to claim 1, wherein the reflector has a metalized surface or is provided with a white coating or is comprised of white plastic.

6. The light module according to claim 1, wherein the output part of the waveguide has its light-emitting surface which is straight or curved.

7. The light module according to claim 1, wherein the input part of the waveguide forms an angle (a) greater than 80° with the output part of the waveguide.

8. The light module according to claim 2, wherein the reflector is disposed on an inner side of a cover of the output part of the waveguide.

9. The light module according to claim 1, wherein the input part of the waveguide has an input surface provided with a roughening.

10. The light module according to claim 4, wherein the reflector has a metalized surface or is provided with a white coating or is comprised of white plastic.

11. The light module according to claim 1, wherein the light module comprises an exterior light module.

12. The light module according to claim 1, wherein the exterior light module comprises a tail light, running light, directional signal light, or daytime light module.

13. The light module according to claim 2, wherein the light source comprises one or more LEDs.

14. The light module according to claim 2, wherein the reflector is curved.

15. The light module according to claim 2, wherein the reflector has a metalized surface or is provided with a white coating or is comprised of white plastic.

16. The light module according to claim 2, wherein the output part of the waveguide has its light-emitting surface which is straight or curved.

17. The light module according to claim 2, wherein the input part of the waveguide has an input surface provided with a roughening.

18. The light module according to claim 14, wherein the reflector has a metalized surface or is provided with a white coating or is comprised of white plastic.

19. The light module according to claim 2, wherein the light module comprises an exterior light module.

20. A light module, comprising:
   a light source;
   a light reflecting unit; and
   an optical waveguide; wherein the waveguide is formed by a plate-shaped body having an L-shaped cross section, the plate-shaped body comprising an input part and an attached output part that together define the L-shaped cross-section, the input part being shorter than the output part, the light-reflecting unit comprises a reflector disposed outside an end of the waveguide and arranged in front of the input part of the waveguide, and wherein at a place where the input part of the waveguide passes into the output part of the waveguide, an angled surface is provided, for total reflection of light passing through the input part of the waveguide to the output part of the waveguide, wherewith a bottom area and an adjacent face of the output part of the waveguide are provided with a white coating; or wherein the waveguide is formed by a second plate-shaped body having an I-shaped cross section, the light-reflecting unit comprises a second reflector disposed outside an end of the waveguide and arranged laterally with respect to a second output part of the waveguide, wherewith a second bottom area and a second adjacent face of the second output part of the waveguide are provided with a second white coating, and wherein light from the light source is reflected by the reflector into the input part, reflected off the angled surface into the output part, and emitted from a face of the output part opposite the bottom area or wherein light from the light source is reflected by the second reflector into the second output part, and emitted from a face of the second output part opposite the second bottom area.

* * * * *